(12) United States Patent  
Matsumoto

(10) Patent No.: US 8,252,068 B2  
(45) Date of Patent: Aug. 28, 2012

(54) METHOD OF MANUFACTURING ELECTROLYTIC CAPACITOR

(75) Inventor: Takayuki Matsumoto, Takeo (JP)

(73) Assignees: SANYO Electric Co., Ltd., Moriguchi-shi (JP); Saga Sanyo Industries Co., Ltd., Kishima-gun (JP)

( * ) Notice: Subject to any disclaimer, the term of this patent is extended or adjusted under 35 U.S.C. 154(b) by 0 days.

(21) Appl. No.: 12/949,203

(22) Filed: Nov. 18, 2010

(65) Prior Publication Data

US 2011/0126389 A1    Jun. 2, 2011

(30) Foreign Application Priority Data

Nov. 27, 2009  (JP) ................. 2009-269856

(51) Int. Cl.  
*H01G 9/00*  (2006.01)
(52) U.S. Cl. ..................................... 29/25.03
(58) Field of Classification Search .................. None  
See application file for complete search history.

(56) References Cited

U.S. PATENT DOCUMENTS

2006/0130300 A1*  6/2006  Kobayashi et al. .......... 29/25.03

FOREIGN PATENT DOCUMENTS

JP          2008-192716 A       8/2008

* cited by examiner

*Primary Examiner* — Seahvosh Nikmanesh  
(74) *Attorney, Agent, or Firm* — Westerman, Hattori, Daniels & Adrian, LLP

(57) ABSTRACT

An electrolytic capacitor is manufactured which includes at least one capacitor element having an anode portion, a dielectric film covering a part of the anode portion and a cathode portion located on the dielectric film; and a piece member attached to each anode portion. The dielectric film is formed on each of a plurality of anode portions including the anode portion. A connecting portion connecting the plurality of anode portions to each other is provided. After the step of providing the connecting portion, the cathode portion is formed on the dielectric film in order to form a plurality of capacitor elements including at least one capacitor element. After the step of forming the cathode portion, the piece member is cut out from the connecting portion in order to separate the plurality of capacitor elements from each other.

7 Claims, 5 Drawing Sheets

METHOD OF MANUFACTURING ELECTROLYTIC CAPACITOR

This nonprovisional application is based on Japanese Patent Application No. 2009-269856 filed on Nov. 27, 2009 with the Japan Patent Office, the entire contents of which are hereby incorporated by reference.

BACKGROUND OF THE INVENTION

1. Field of the Invention

The present invention relates to a method of manufacturing an electrolytic capacitor.

2. Description of the Related Art

According to Japanese Patent Laying-Open No. 2008-192716, a stacked solid electrolytic capacitor having a plurality of capacitor elements stacked one on top of the other is disclosed. The capacitor element has an anode body made of metal foil having a valve action, a dielectric layer and a cathode body layer.

SUMMARY OF THE INVENTION

In order to improve the efficiency of manufacturing a capacitor, it is desired to form a cathode portion on each of a plurality of anode portions at the same time, that is, to collectively form a plurality capacitor elements. For that purpose, the method as described below may be proposed, for example.

First, a plurality of anode portions each having a surplus portion are prepared. Surplus portions are connected to each other via a connecting portion, to thereby cause the plurality of anode portions to be integrated. Then, a cathode portion is formed in each of the plurality of integrated anode portions at the same time. When each surplus portion is cut and separated, each surplus portion and connecting portion are removed. Consequently, a plurality of capacitor elements are obtained.

In the above-described method, when the surplus portion is separated, that is, the anode portion is cut, stress tends to be applied to the interface between the anode portion and the cathode portion. Consequently, the interface suffers damage, which may cause an increase in the leakage current of the electrolytic capacitor. In other words, the reliability of the electrolytic capacitor may be lowered.

The present invention has been made to solve the above-described problems. An object of the present invention is to provide a method of manufacturing an electrolytic capacitor that allows an electrolytic capacitor having high reliability to be manufactured.

A method of manufacturing an electrolytic capacitor according to the present invention provides a method of manufacturing an electrolytic capacitor including at least one capacitor element having an anode portion, a dielectric film covering a part of the anode portion and a cathode portion located on the dielectric film; and a piece member attached to each anode portion. The method includes the following steps.

The dielectric film is formed on each of a plurality of anode portions including the anode portion. A connecting portion connecting the plurality of anode portions to each other is provided. After the step of providing the connecting portion, the cathode portion is formed on the dielectric film in order to form a plurality of capacitor elements including at least one capacitor element. After the step of forming the cathode portion, the piece member is cut out from the connecting portion in order to separate the plurality of capacitor elements from each other.

According to the method of manufacturing an electrolytic capacitor of the present invention, in place of the anode portion, the connecting portion is cut for separating a plurality of capacitor elements from each other. Thus, the plurality of capacitor elements can be separated from each other without applying stress to the interface between the anode portion and the cathode portion, with the result that the damage to the interface as described above can be suppressed. Therefore, an electrolytic capacitor having high reliability can be manufactured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments according to the present invention will be hereinafter described with reference to the drawings.

First Embodiment

Figure 1:
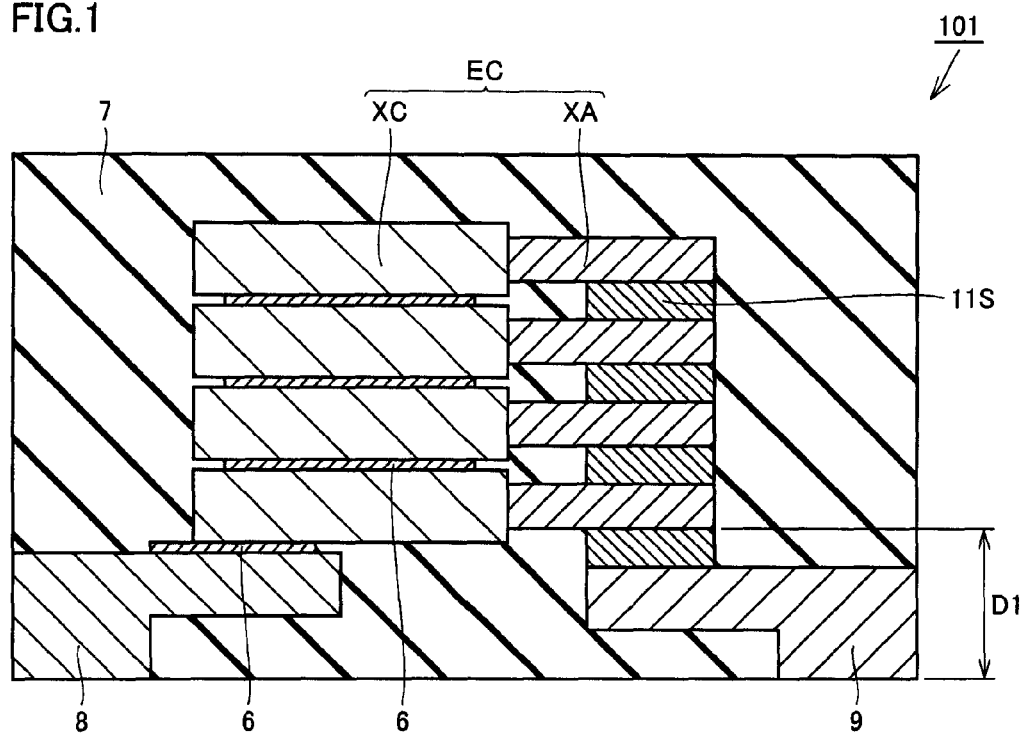
FIG. 1 is a cross-sectional view schematically showing the configuration of a solid electrolytic capacitor in the first embodiment according to the present invention.

Referring to FIG. 1, a solid electrolytic capacitor 101 according to the present embodiment includes a plurality of capacitor elements EC, a plurality of spacers 11S (piece member), an anode terminal 9, a cathode terminal 8, an outer resin 7, and an electrically conductive adhesive 6. Each of capacitor elements EC includes an anode exposed portion XA and a cathode exposed portion XC. The thickness of anode exposed portion XA (the dimension in the longitudinal direction in the figure) is less than that of cathode exposed portion XC.

Each capacitor element EC is provided with spacer 11S. Spacer 11S is formed of a conductor, and preferably, formed of a material including copper or a copper-based material. Furthermore, spacer 11S preferably has a thickness of 0.2 mm or more and 0.4 mm or less, a length (the dimension in the lateral direction in the figure) of 1 mm or more and 2 mm or less, and a width equal to the width of anode exposed portion XA. Furthermore, spacer 11S has the length shorter than the length of anode exposed portion XA and is disposed so as not to be in contact with cathode exposed portion XC.

The plurality of capacitor elements EC are stacked in the thickness direction (the longitudinal direction in the figure). More specifically, the plurality of anode exposed portions XA are welded via each spacer 11S and stacked one on top of the other. The plurality of cathode exposed portions XC are bonded by electrically conductive adhesive 6 and stacked one on top of the other. It is to be noted that the thickness of spacer 11S is sufficiently greater than the thickness of electrically conductive adhesive 6.

Figure 2:
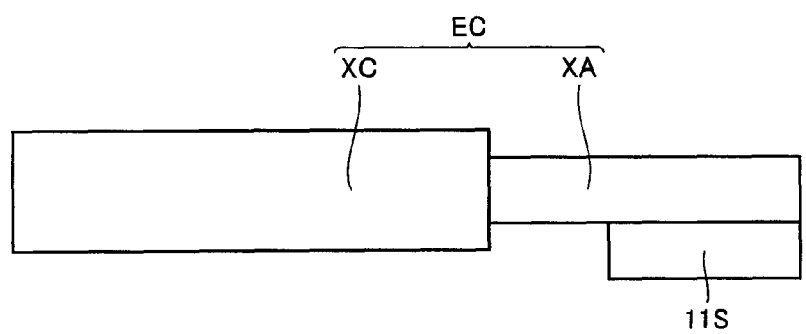
FIG. 2 is a front view schematically showing the configuration of a capacitor element provided with a spacer and included in the solid electrolytic capacitor in the first embodiment according to the present invention.
Figure 3:
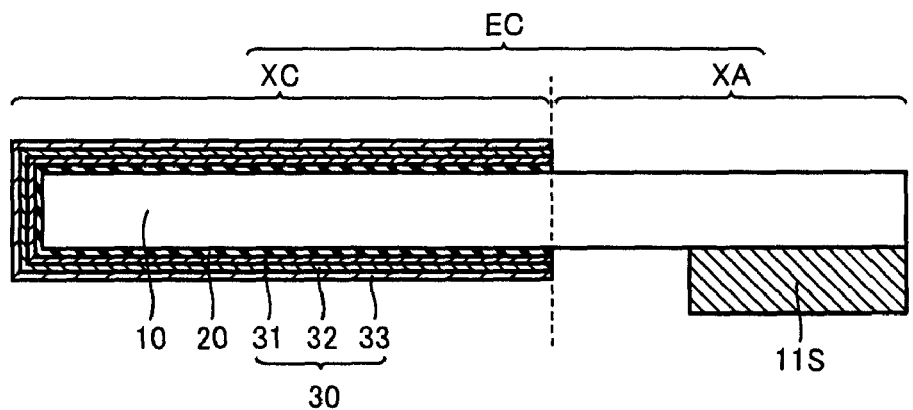
FIG. 3 is a cross-sectional view schematically showing the configuration of a capacitor element provided with a spacer and included in the solid electrolytic capacitor in the first embodiment according to the present invention.

Referring to FIGS. 2 and 3, each capacitor element EC includes a metal foil 10 (anode portion), an oxide film 20 (dielectric film) and a cathode portion 30.

The surface of metal foil 10 is subjected to etching for increasing the surface area. Furthermore, metal foil 10 is made of a valve metal, and in the present embodiment, made of aluminum. It is to be noted that, for example, tantalum or niobium may be used other than aluminum.

Oxide film 20 is formed by oxidizing metal foil 10 so as to cover the portion of metal foil 10 included in cathode exposed portion XC.

Cathode 30 is formed on oxide film 20. More specifically, a solid electrolyte layer 31, a carbon layer 32 and a silver paint layer 33 are formed in this order on metal foil 10 with oxide film 20 interposed therebetween. Solid electrolyte layer 31 is formed of conductive polymers of a polythiophene system, a polypyrrole system or a polyaniline system, for example.

As shown in FIG. 3, cathode exposed portion XC includes cathode portion 30, a portion of metal foil 10 covered by cathode portion 30 and oxide film 20 insulating this portion from cathode portion 30. Furthermore, anode exposed portion XA includes a portion of metal foil 10 which is not covered by cathode portion 30. Accordingly, cathode exposed portion XC has a thickness which is larger by twice the sum of the thickness of cathode portion 30 and the thickness of oxide film 20 as compared with anode exposed portion XA.

The method of manufacturing solid electrolytic capacitor 101 will then be described.

Referring to FIG. 3, in step S11 (FIG. 4), a plurality of metal foils 10 each provided with oxide film 20 are formed. Oxide film 20 is formed, for example, by subjecting metal foil 10 to chemical conversion at a prescribed voltage in the aqueous solution such as phosphoric acid having a prescribed concentration.

Figure 4:
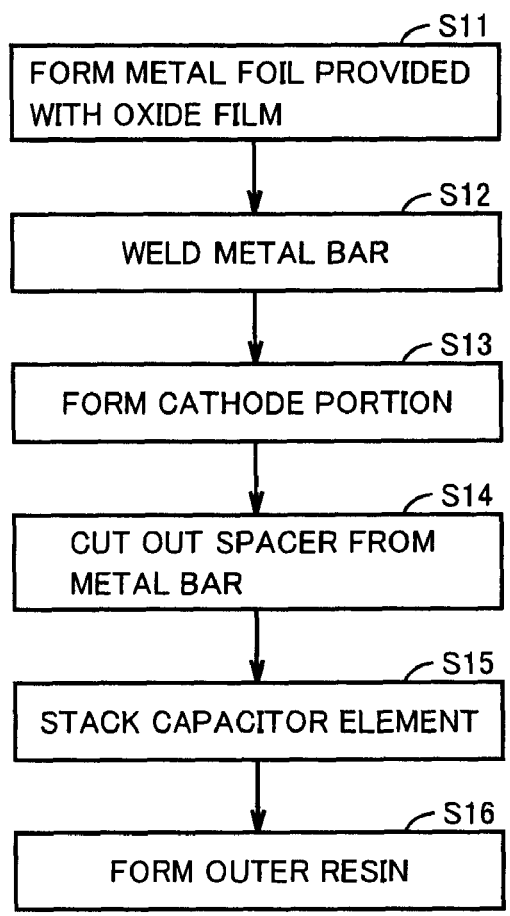
FIG. 4 is a flow diagram schematically showing the method of manufacturing the solid electrolytic capacitor in the first embodiment according to the present invention.
Figure 5:
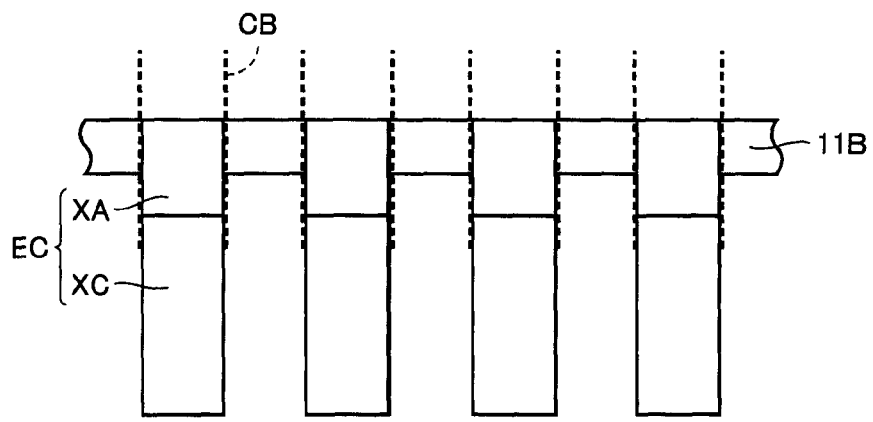
FIG. 5 is a plan view schematically showing a process of the method of manufacturing the solid electrolytic capacitor in the first embodiment according to the present invention.

Further referring to FIG. 5, a metal bar 11B (connecting portion) is first prepared in step S12 (FIG. 4). Metal bar 11B is made of the same material as that of spacer 11S, and has a width corresponding to the length of spacer 11S (the dimension in the longitudinal direction in FIG. 5) and a thickness corresponding to the thickness of spacer 11S. Metal bar 11B is then resistance-welded to one end (upper end in FIG. 5) of each of the plurality of metal foils 10. Consequently, the plurality of metal foils 10 are connected to each other, which allows collective and easy handling of the plurality of metal foils 10.

It is to be noted that a part of oxide film 20 on metal foil 10 is removed with the above-described welding operation. Therefore, metal foil 10 can be connected to metal bar 11B without electrical insulation therebetween by oxide film 20.

In step S13 (FIG. 4), cathode portion 30 is formed on oxide film 20 on the other end (lower end in FIG. 5) of each of the plurality of metal foils 10. Specifically, the following steps are performed.

The above-described other end is first immersed in the mixed solution containing 3,4-ethylene dioxythiophene, P-toluenesulfonic acid iron (III) and I-butanol. Consequently, a conductive polymer layer made of conductive polymer poly-3,4-ethylene dioxythiophene is formed as solid electrolyte layer 31 on oxide film 20 by chemical oxidation polymerization.

Carbon layer 32 is formed on the portion having solid electrolyte layer 31 formed as described above. Specifically, immersion into the solution containing carbon powders dispersed in water or an organic solvent is followed by drying, which is repeatedly performed.

Silver paint layer 33 is formed on the portion having carbon layer 32 formed as described above. Consequently, the configuration as shown in FIG. 5 is achieved, that is, the configuration including a plurality of capacitor elements EC each having cathode exposed portion XC and anode exposed portion XA, and metal bar 11B welded to each of anode exposed portions XA.

In step S14 (FIG. 4), metal bar 11B is cut along a cutting line CB (FIG. 5) so as to avoid application of stress to capacitor element EC as far as possible. Thus, the plurality of capacitor elements EC are separated from each other, and spacer 11S welded to each capacitor element EC (FIG. 2) is cut from metal bar 11B.

Referring to FIG. 1, in step S15 (FIG. 4), the plurality of capacitor elements EC are stacked on cathode terminal 8 and anode terminal 9. Specifically, cathode exposed portions XC are bonded by electrically conductive adhesive 6 and stacked one on top of the other, and anode exposed portions XA are resistance-welded via spacer 11S and stacked one on top of the other.

Outer resin 7 is formed in step S16 (FIG. 4). Consequently, solid electrolytic capacitor 101 is obtained.

Mainly referring to FIG. 6, the manufacturing method in the first comparative example with respect to the present embodiment will be hereinafter described.

A plurality of metal foils are first prepared. Each of the metal foils is greater in area than metal foil 10 of the present embodiment by an amount corresponding to a surplus portion XM. Furthermore, oxide film 20 is formed on each metal foil.

Then, each surplus portion XM is welded to a carrier bar 12 made of, for example, stainless steel, aluminum, iron, or the material having one of those as a base material. This causes the plurality of metal foils to be integrated via carrier bar 12. Cathode 30 is formed in each of the plurality of integrated metal foils at the same time. This leads to formation of the configuration shown in FIG. 6, that is, an element ET having cathode exposed portion XC, anode exposed portion XA and surplus portion XM and formed by using each of the plurality of metal foils. Surplus portion XM of element ET is then cut and separated along cutting line CE, thereby removing surplus portion XM and carrier bar 12 (FIG. 7: step S21). Consequently, the plurality of capacitor elements EC (FIG. 2) are obtained. Spacer 11S (FIG. 2) is then welded to each capacitor element EC (FIG. 7: step S22). The same process as that in the present embodiment is thereafter carried out to achieve solid electrolytic capacitor 101 (FIG. 1).

According to the present comparative example, when element ET (FIG. 6) is cut, stress tends to be applied to the interface between the metal foil and cathode portion 30, with the result that this interface tends to suffer damage. This damage may cause an increase in the leakage current of the electrolytic capacitor, thereby decreasing the reliability of the electrolytic capacitor. It is to be noted that the metal foil has a surface provided with a fine structure for increasing the surface area. The finer the structure is, the more the electrostatic capacitance of the capacitor can be improved, in which case, however, the above-described damage is more likely to occur.

In contrast, according to the present embodiment, in place of metal foil 10, metal bar 11B is cut as indicated by cutting line CB (FIG. 5) for separating the plurality of capacitor elements EC from each other. Accordingly, the plurality of capacitor elements EC can be separated from each other without applying stress to the interface between metal foil 10 and cathode portion 30 (FIG. 3). Therefore, the damage to the above-described interface can be suppressed, which allows improvement in the reliability of solid electrolytic capacitor 101 (FIG. 1).

Furthermore, according to the present comparative example, the process of providing carrier bar 12 is required. In contrast, according to the present embodiment, metal bar 11B not only serves as a material for forming spacer 11S but also performs the same function as that of carrier bar 12 during formation of cathode portion 30, which eliminates the need of the process of providing carrier bar 12. Therefore, the manufacturing process is further simplified.

Furthermore, according to the present comparative example, it is necessary to weld each of the plurality of spacers 11S separated from each other to capacitor element EC. On the other hand, the present embodiment only requires welding of one metal bar 11B serving as a plurality of spacers 11S, which improves the workability at the time of welding.

Figure 6:
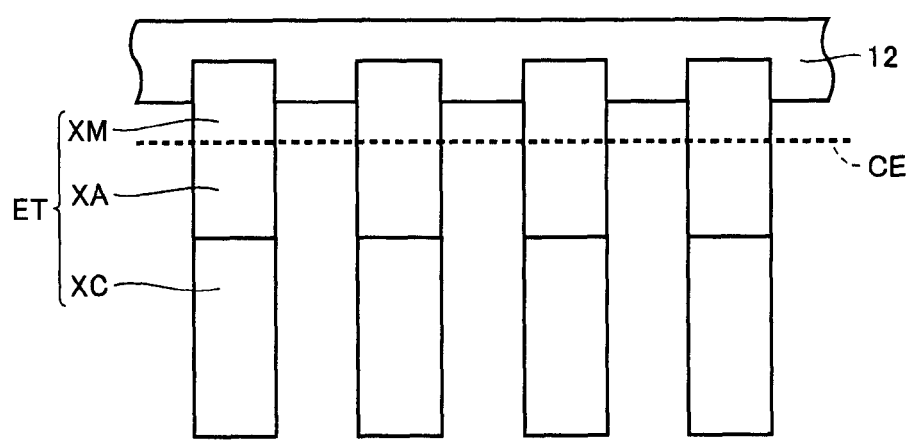
FIG. 6 is a plan view schematically showing a process of the method of manufacturing the solid electrolytic capacitor of the first comparative example.
Figure 7:
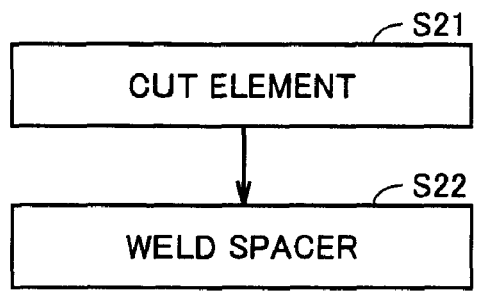
FIG. 7 is a flow diagram schematically showing a part of the method of manufacturing the solid electrolytic capacitor of the first comparative example.

Furthermore, according to the present comparative example, the portion above cutting line CE in FIG. 6 is removed and discarded. In other words, carrier bar 12 and surplus portion XM of element ET will be discarded. On the other hand, according to the present embodiment, only a part of metal bar 11B (FIG. 5) is discarded, which allows a reduction in the material cost and the amount of waste products.

Figure 8:
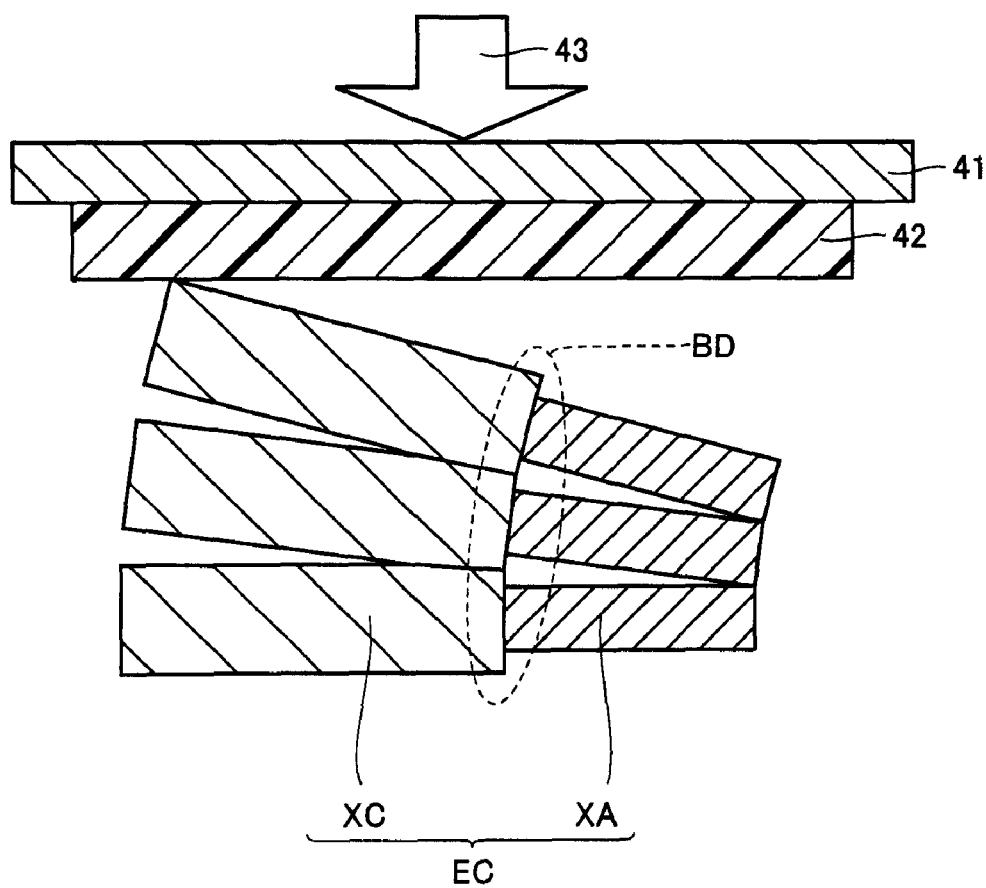
FIG. 8 is a cross-sectional view schematically showing a process of the method of manufacturing the solid electrolytic capacitor of the second comparative example.

Mainly referring to FIG. 8, the manufacturing method in the second comparative example with respect to the present embodiment will be described. In the present comparative example, the plurality of capacitor elements EC are stacked without spacer 11S. This stacking process is performed, for example, in the state where a silicon rubber 42 provided on a stainless steel plate 41 is pressed against capacitor element EC by pressing force 43. In this case, stress may be concentrated on the end of cathode exposed portion XC located at the boundary between cathode exposed portion XC and anode exposed portion XA (an area surrounded by a dashed-line BD in FIG. 8), with the result that capacitor element EC may suffer damage. Since this damage may result in an increase in the leakage current of capacitor element EC, the reliability of solid electrolytic capacitor 101 may be decreased.

On the other hand, according to the present embodiment, when capacitor elements EC are stacked and connected, the above-described stress is reduced by spacer 11S. Therefore, the reliability of solid electrolytic capacitor 101 can be improved.

Preferably, the thickness of spacer 11S (FIG. 3), that is, the thickness of metal bar 11B (FIG. 5), is approximately twice as much as the sum of the thickness of oxide film 20 (FIG. 3) and the thickness of cathode portion 30 (FIG. 3). Accordingly, the difference in the thickness between cathode exposed portion XC and anode exposed portion XA can be compensated by spacer 11S with more accuracy. Consequently, the effects of reducing the above-described stress can be enhanced.

Second Embodiment

Figure 9:
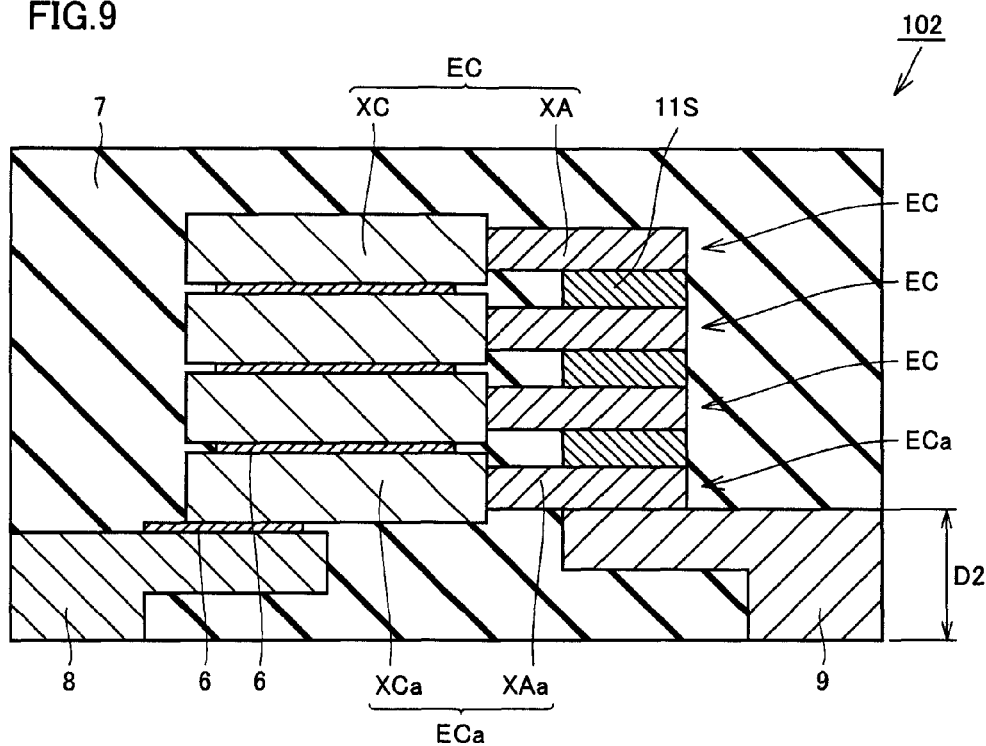
FIG. 9 is a cross-sectional view schematically showing the configuration of the solid electrolytic capacitor in the second embodiment according to the present invention.

Mainly referring to FIG. 9, a solid electrolytic capacitor 102 in the present embodiment includes a capacitor element ECa (the third capacitor element) in addition to capacitor element EC described above. Capacitor element ECa includes a cathode exposed portion XCa and an anode exposed portion XAa which are identical in configuration to cathode exposed portion XC and anode exposed portion XA, respectively, of capacitor element EC. Furthermore, capacitor element ECa as a component of solid electrolytic capacitor 102 is formed by the process different from that of capacitor element EC and has a configuration without spacer 11S attached thereto. In the state where capacitor element ECa thus obtained is attached to spacer 11S attached to capacitor element EC, capacitor element ECa is connected to capacitor element EC.

Furthermore, anode terminal 9 is directly connected to anode exposed portion XAa of capacitor element ECa. In other words, anode terminal 9 is directly connected to the anode portion of capacitor element ECa.

In the case where capacitor element ECa as a component is formed without spacer 11S attached thereto as described above, solid electrolytic capacitor 102 is not provided with spacer 11S between anode exposed portion XAa and anode terminal 9.

Since other configurations are the same as those of the first embodiment, the same or corresponding components are designated by the same reference characters and description thereof will not be repeated.

According to the present embodiment, a dimension D1 (FIG. 1) in the first embodiment can be reduced to a smaller dimension D2. In other words, the thickness of the solid electrolytic capacitor can be decreased.

Third Embodiment

Figure 10:
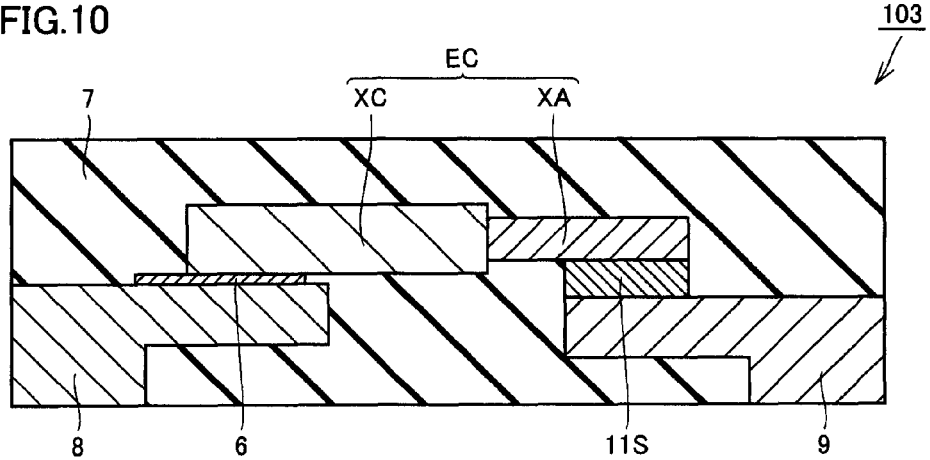
FIG. 10 is a cross-sectional view schematically showing the configuration of the solid electrolytic capacitor in the third embodiment according to the present invention.

Referring to FIG. 10, a solid electrolytic capacitor 103 in the present embodiment has one capacitor element EC instead of a plurality of capacitor elements EC. Since other configurations are the same as those of the first embodiment, the same or corresponding components are designated by the same reference characters and description thereof will not be repeated.

According to the present embodiment, in the process of forming a plurality of capacitor elements EC for manufacturing a plurality of solid electrolytic capacitors 103, the plurality of capacitor elements EC are separated from each other as shown in FIG. 5, which allows a reduction in the damage to capacitor element EC as in the first embodiment. Consequently, the reliability of solid electrolytic capacitor 103 can be improved.

Although oxide film 20 is formed before metal bar 11B is welded in each of the above-described embodiments, oxide film 20 may be formed after metal bar 11B is welded. In this case, oxide film 20 may be selectively formed only on the portion of each of the plurality of metal foils 10 which will be included in cathode exposed portion XC. This process can be carried out collectively for a plurality of metal foils 10 due to existence of metal bar 11B (FIG. 5).

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing an electrolytic capacitor including at least one capacitor element having an anode portion, a dielectric film covering a part of said anode portion and a cathode portion located on said dielectric film; and a piece member attached to each anode portion, said method comprising the steps of:

forming said dielectric film on each of a plurality of anode portions including said anode portion;

preparing a connecting portion having portions corresponding to a plurality of piece members including said piece member;

connecting said plurality of anode portions to the portions corresponding to said plurality of piece members, respectively;

after said step of connecting said plurality of anode portions, forming said cathode portion on said dielectric film in order to form a plurality of capacitor elements including said at least one capacitor element; and after said step of forming said cathode portion, cutting said connecting portion to cut out said piece member having said anode portion connected thereto from said connecting portion.

2. The method of manufacturing an electrolytic capacitor according to claim 1, wherein said at least one capacitor element includes first and second capacitor elements, and said method further comprises the step of connecting said first and second capacitor elements to each other via said piece member.

3. The method of manufacturing an electrolytic capacitor according to claim 2, wherein a thickness of said piece member is approximately twice as much as a sum of a thickness of said dielectric film and a thickness of said cathode portion.

4. The method of manufacturing an electrolytic capacitor according to claim 1, wherein said electrolytic capacitor includes a third capacitor element, and said method further comprises the step of connecting one of said at least one capacitor element and said third capacitor element to each other.

5. The method of manufacturing an electrolytic capacitor according to claim 4, further comprising the step of connecting an anode terminal to an anode portion of said third capacitor element.

6. The method of manufacturing an electrolytic capacitor according to claim 1, wherein said step of connecting said plurality of anode portions includes the step of connecting said plurality of anode portions to said connecting portion by welding.

7. The method of manufacturing an electrolytic capacitor according to claim 1, wherein said step of connecting said plurality of anode portions is performed after said step of forming said dielectric film.

* * * * *